April 1, 1924.   J. H. HAMMOND, JR.   1,489,031
RADIODYNAMIC SYSTEM AND METHOD FOR AVOIDING WAVE INTERFERENCE
Original Filed March 25, 1914   2 Sheets-Sheet 1

Witnesses:
Horace A. Crossman
Carl L. Choate

Inventor:
John Hays Hammond, Jr.
by Emery, Booth, Janney and Varney
Attys

April 1, 1924.

J. H. HAMMOND, JR 1,489,031

RADIODYNAMIC SYSTEM AND METHOD FOR AVOIDING WAVE INTERFERENCE

Original Filed March 25, 1914   2 Sheets-Sheet 2

Patented Apr. 1, 1924.

1,489,031

UNITED STATES PATENT OFFICE.

JOHN HAYS HAMMOND, JR., OF GLOUCESTER, MASSACHUSETTS.

RADIODYNAMIC SYSTEM AND METHOD FOR AVOIDING WAVE INTERFERENCE.

Application filed March 25, 1914, Serial No. 827,228. Renewed August 25, 1923.

*To all whom it may concern:*

Be it known that I, JOHN HAYS HAMMOND, Jr., a citizen of the United States, and a resident of Gloucester, in the county of Essex and State of Massachusetts, have invented an Improvement in Radiodynamic Systems and Methods for Avoiding Wave Interference, of which the following description, in connection with the accompanying drawings, is a specification, like characters on the drawings representing like parts.

This invention relates to means, systems and methods for preventing interference in receiving stations operated by radiant energy for the purpose of receiving or recording signals or messages, or for controlling mechanisms or devices, or for other purposes.

In order that the principle of the invention may be readily understood, I shall describe one embodiment of means for practicing the same and shall disclose it in connection with a system for operating or controlling one or more mechanisms from a distance, it being understood that the invention may be embodied in widely differing systems for widely different purposes.

Heretofore in the art of radio-telegraphy and radio-dynamics, means have been devised for the purpose of obtaining immunity at a receiving station from extraneous interference, such devices being shown for example in U. S. Patents, No. 725,605 granted to Nikola Tesla; No. 725,635 granted to John Stone; No. 816,234 granted to C. D. Ehret; and No. 894,378 granted to Lee De Forest.

These patents disclose typical means to prevent the extraneous interference emanating from radio transmitting stations from actuating the final recording device in a radio-receiving station.

The principle upon which the invention disclosed in said patents is based is that a plurality of receiving circuits are employed, each having its respective inductance, condensers, detectors and relays. These several circuits are tuned to different electrical frequencies and are supposed to respond to electromagnetic waves of different lengths. When a plurality of waves are received whose frequencies are in syntony with the frequencies of the two receiving circuits, the said circuits act cooperatively to allow a recording device to function. The transmitting station is intended to emit the proper waves simultaneously or in very rapid succession after the manner of multiplex radio telegraph systems.

In my co-pending U. S. application No. 682,192, filed March 7, 1915, I have shown mechanism to produce at any transmitting station practically any number of waves almost simultaneously, and for convenience of description I shall hereafter refer to this as a wave siren. With this mechanism I can interfere with all of the so-called non-interferable systems above referred to or known to me. No determination of the wave characteristics employed in the systems above referred to would have to be made by the operator who, by means of my said wave siren, desires to interfere with receiving stations, since the waves used by the said systems would be among those constantly emitted by the wave siren.

This constitutes a serious objection to the employment of such so-called non-interferable systems, and moreover they necessitate the employment of a plurality of detectors, sensitive relays, tuning condensers, etc. For certain branches of work such as the control by radiant energy of moving bodies, among which I may enumerate torpedoes and aeroplanes, the presence of a plurality of sensitive and difficultly adjusted instruments would constitute a great detriment to the practical operation of the systems employed for such control.

I have devised and herein have shown one embodiment of receiving system employing preferably only the same number of detectors, sensitive relays, condensers, etc., that are employed in any system of recording radio-telegraphy, and means are preferably provided for avoiding interference by any form of wave siren or other interference maker known to me.

I preferably provide a single receiving, oscillatory, closed circuit, and thereby overcome a serious objection incident to the employment of two receiving circuits connected to one receiving antenna, namely, the necessity that such circuits have a large difference in their periods of oscillation in order to prevent one circuit from absorbing energy from the other, and to prevent various other complex phenomena of inter-reaction that would occur between said circuits. It is a difficult matter to produce two different waves of largely different length at a transmitting station if any suitable form of undamped continuous wave producer be used.

In my system, and in accordance with my method, when utilizing electromagnetic waves, I preferably employ only a single circuit and change the electrical constants of this circuit so that it is not necessary to employ waves having unsuitable differences of frequencies. Such single system is simpler, more reliable and more practical than those employing a plurality of circuits and is uninterferable to extraneous electrical disturbances, except those of such energy that the old methods of electrical tuning are unavailing. Furthermore I have found that by judicious choice of wave lengths and by employing very loose inductive coupling between the open and closed circuits, it is not practicable to endeavor to "force" the circuits and thereby obtain interference.

In accordance with my invention and in the practice of my method and system, I transmit a plurality of differently characterized or contrasting impulses or sets of impulses, as for example two, to the first of which only the receiving circuit is responsive and the receipt of which automatically changes the electrical value or constants of the said circuit, as for example by changing its inductance, so that the circuit is then responsive only to the other or to the second impulse or set of impulses, and upon receipt of which the desired result may be effected, as will be more fully set forth hereinafter. Obviously my system and method may be extended to the use of any suitable number of wave impulses or sets of impulses in excess of two.

Whether or not I employ a single circuit, I provide mechanism whereby upon interference, if by any possibility the same be effected, the constants of the receiving circuit are automatically changed, so that the circuit will not then respond to the wave characteristics or order of contrasting wave impulses by which interference was produced, but will respond only to certain other wave characteristics or other order of contrasting wave impulses known to the operator at the proper distant transmitting station. The act of interference by an interfering or hostile transmitting station therefore automatically alters the constants of the receiving circuit, but in a manner known to the operator at the proper or non-hostile transmitting station who will thereupon transmit waves having frequency, lengths or other characteristics or values to which the circuit, as thus altered, is alone responsive.

In accordance with my invention, I effect preferably automatically a variance or change in the electrical values of the receiving circuit, and I may change either the inductance or the capacities of the open and closed oscillatory circuit, as will be evident. In the disclosed embodiment of the invention I have represented means for varying the inductance thereof, but within the broad principle of my invention, I may vary either the inductance or the capacity or in any other suitable manner vary the electrical values, so that the receiving oscillatory circuit will respond only to waves of other characteristics than those to which the circuit responded before interference. Within the scope of my invention I may automatically upon interference and in any suitable manner change the electrical values of the receiving circuit to any desired one of two or more other values instead of to a single other value as herein disclosed, in which case a corresponding number of wave characteristics would be employed, in order that a wave or set of waves may be transmitted to which the changed receiving circuit is responsive.

In accordance with my invention I also preferably provide an automatically operated switch device by which the receiving circuit is wholly cut out at certain periods of time, thus preventing the receipt of impulses for any purpose, and thereby avoiding all possibility whatever of interference.

In the accompanying drawings,—

Any suitable transmitting circuit may be employed at the control station. I employ means for sending two or other plurality of wave characteristics, such for example as two or more different wave lengths, irrespective of the coupling of the transmitting circuit, but inasmuch as any coupling system will give off two different wave lengths, if not too loosely coupled, either of such wave lengths may be employed for my purpose. I preferably employ means whereby I may send out waves or sets of waves of properly contrasted lengths at suitably close intervals.

Figures 1, 2:
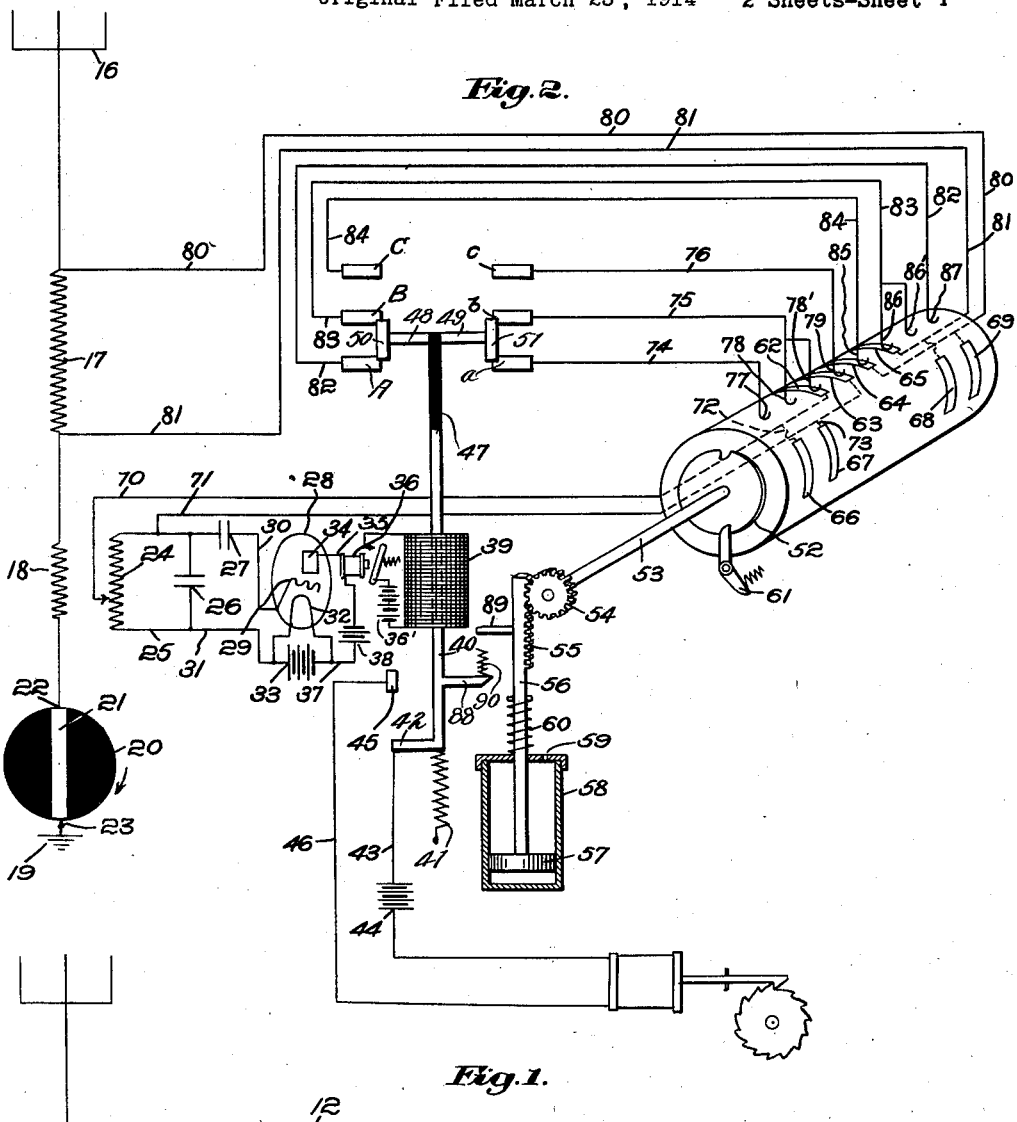
Fig. 1 is a diagrammatic view of a transmitting circuit adapted to transmit a plurality of differently characterized waves and as herein shown two different wave lengths.
Fig. 2 is a diagrammatic illustration of one type of receiving station embodying my invention.

I have herein represented a transmitting circuit containing condensers of two different values. In Fig. 1, a generator is indicated at 1, which may be of any suitable voltage. Leading therefrom are wires 2, 3 provided with choke coils 4, 5 to prevent the high frequency oscillating currents from reaching and injuring the generator. I have represented a suitable resistance, here taking the form of an arc 6. In parallel with the arc 6, are two condensers, each of which includes a stationary conducting disc or plate 7, and a conducting disc or plate 8 which is arranged to be rotated about a fixed axis and in a plane parallel to the plane of the plate 7 by any suitable motor 9, the two condensers being of different values or capacities, and that condenser being employed which will result in the generation of impulses to which the receiving circuit is responsive at any period of time. At 10 I have indicated another condenser and at 11 a primary inductance coil so positioned as to allow transference of energy from its closed circuit to the open aerial circuit 12, which latter may be of any suitable type and which is provided with a secondary inductance 13 and leading to earth 14. The open aerial circuit is provided in a well known manner with a suitable inductance 15 to receive energy from the closed circuit when the impulses are not being transmitted to the receiving station. Any other suitable type of transmitting circuit or system adapted to the purpose may be employed as stated, that herein represented being merely representative of a large number that may be employed. By the said circuit, and the co-operation of the motors 9 with the condensers 7 and 8 in a well known manner, I preferably transmit two different wave lengths or sets of wave lengths in rapid or sufficiently rapid succession. I may, however, employ a circuit or station by which I may transmit any desired greater number than two wave lengths or wave characteristics, in any desired sequence, as will be obvious without further explanation.

In Fig. 2 I have represented one embodiment of the receiving circuit. Therein I have represented the receiving antenna at 16, it being provided with a winding 17 and a primary winding 18 connected to ground at 19. At 20, I have represented a drum or disk adapted to be rotated by a motor or otherwise, preferably at a fixed, predetermined rate and provided with a switch or conducting strip 21, either end of which is adapted to be brought into engagement with the wire of the receiving antenna at 22, 23. The other portions of the disk or drum 20 are insulated, so that it is only when the conducting strip 21 is upright that the receiving antenna is connected to earth. By rotating said drum or disk 20 at a known speed, the receiving circuit is disconnected or broken, excepting at known intervals, as will be hereinafter more fully set forth.

I have represented at 24 a secondary winding of the closed oscillatory circuit 25 having condensers 26, 27, the latter being a stopping condenser, and also having a suitable detector of electrical oscillations. While for that purpose I may employ any suitable detector, I have herein represented a so-called audion 28, the grid 29 thereof being connected to the wire 30 of the circuit 25. The wire 31 of said circuit 25 is connected to the filament 32 of said audion, in circuit with which is the battery 33. From the metal plate 34 of the audion leads a wire 35 connected to the relay 36, and from the battery 33 and filament 32 leads a wire 37 also connected to the relay 36 and having a battery 38. The relay 36 is arranged to control a normally open circuit including a battery 36' which is arranged to energize a solenoid 39, the core or plunger 40 of which is provided at its lower end with a coiled spring 41 by which said core or plunger is held in depressed position when the solenoid is not energized. The lower end of the solenoid is preferably provided with an offset portion 42 from which leads a wire 43 in circuit with a battery 44 and preferably leading to a commutator or other part, device or mechanism to be operated, but which within the scope of my invention may lead to any suitable recording or receiving instrument. Within the range of movement of the offset portion 42 of the plunger, I provide a terminal 45 which is connected by wire 46 to the commutator or other mechanism or device to be operated or to the indicating or recording instrument, so that upon energization of the solenoid 39 and herein by both the impulses or set of impulses from the transmitting station, as hereinafter set forth, its plunger 40 makes contact with the terminal 45 and thereupon the circuit is completed and motion is transmitted to the mechanism or device to be controlled or moved or the indicating or recording mechanism is operated, or any other desired result is effected.

I may provide any suitable means controlled or actuated upon energization of the solenoid 39, as for example a valve controlling the admission of fluid under pressure to one or more mechanisms whereby they may be operated as desired, as shown for example in my co-pending application Serial No. 816,600, filed Feb. 4, 1914, or an electrical commutator or other device, or a recording or indicating instrument, it being evident that my invention is not limited to the control or actuation of any particular mechanism, part or device, as it is capable of use in widely varying relations.

Upon the transmission by the sending circuit, shown in Fig. 1, of an impulse or set of impulses to which the closed, oscillatory circuit 25 is responsive at the instant of receipt, the solenoid 39 is energized so as to impart movement to its core 40, but not sufficient to effect the operation of the mechanism or instrument or device referred to. Inasmuch as the enemy may transmit impulses of a wave length or characteristic to which the circuit 25 is responsive as thus far described, I provide means whereby the response of the circuit 25 to such impulse will automatically vary the electrical value of the circuit so that it is no longer responsive to such impulse but will respond only to another predetermined impulse, which will be unknown to the enemy, but which will be known to the operator at the proper sending station, and which is the second impulse or set of impulses sent out by the transmitting station and having a differentiated characteristic, as above set forth. The receipt of the second impulse is necessary to effect the further, final or continued energization of the solenoid 39 and to effect the ultimate closure of the circuit by which the final result previously referred to is produced, it being evident that the system may be extended to the use of more than two differently characterized impulses or sets of impulses.

While, as previously stated, this change in the electrical value of the receiving circuit may be effected in any suitable manner, I preferably change the inductance of the circuit to one known other value, though within the scope of my invention the system may be elaborated to cause the inductance to be changed to any one of a series of other values. In that simplest form of my invention herein illustrated, however, I have illustrated its use in connection with one other value of inductance.

In order to accomplish this result, I have represented the upper end of the core or plunger 40 as having an insulated portion 47 provided with oppositely extending arms 48, 49 having strips 50, 51 adapted respectively to engage the several terminals A, B, C and a, b, c in succession and thus to complete circuits as hereinafter set forth.

Upon a suitable support, I mount a commutator 52 having a shaft 53 provided with a pinion 54 which is adapted to be rotated by a rack 55 upon the piston rod 56 of a piston 57 mounted in a suitable cylinder 58 having therein a small port 59 for the escape of air upon the upward movement of the piston 57. I employ a suitable spring 60 preferably surrounding the piston rod exterior to the cylinder and acting normally to depress the piston 57. The pinion 54 is provided with any suitable means such as a ratchet and pawl mechanism to cause turning of the said pinion 54 in a clockwise direction to also turn the shaft 53 upon upward movement of the rack 55, but to permit the pinion 54 to be rotated freely in a counter-clockwise direction with respect to its shaft 53 upon a downward or return movement of the rack 55. The commutator 52 is provided with a suitable ratchet or other device 61 to prevent over movement thereof and to hold it in the position to which it is turned. Upon its surface it is provided with contact plates 62, 63, 64, 65, 66, 67, 68, 69.

In electrical connection with the receiving circuit 25 I provide a wire or conductor 70 leading to the secondary inductance 24 and by means of which a portion thereof may be cut out as indicated, thereby to vary the inductance to a known extent. Also leading to said circuit is a conductor 71. The conductor 70 leads to the contact plate 62 and the conductor 71 leads to the contact plate 63. The contact plate 66 is also connected at 72 to the conductor 70, and the contact plate 67 is connected at 73 to the conductor 71.

Leading from the terminals a, b, c are conductors 74, 75 and 76 respectively, which terminate in brushes 77, 78, 78' and 79. In the position shown the brush 78' contacts with the contact strip 62, and the brush 79 with the contact strip 63, and upon further rotation of the commutator the said brushes 78', 79 will be withdrawn from said contact plates and the brushes 77, 78 will make contact with the contact plates 66, 67.

Leading from the coil 17 of the open receiving circuit are conductors 80, 81, the former leading to the contact strips 64 and 69, and the latter leading to the contact strips 65, 68. Leading from the terminals A, B, C are conductors 82, 83, 84 respectively, which terminate in brushes 87, 86', 86, 85 respectively. In the position shown the brush 85 makes contact with the contact strip 64 and the brush 86 with the contact strip 65, and upon further rotation of the commutator the brushes 86', 87 will respectively engage the contact strips 68, 69.

Upon energization of the solenoid 39, by the first impulse or set of impulses sent from the transmitting stations as previously described, the contact pieces 50, 51 which normally short circuit the terminals A, B, a, b will be lifted so as to short circuit the terminals C, B, c, b, where upon receipt of the second impulse or set of impulses they will be held until the final indicating recording or other movement is effected through the closing of the switch 42, 45.

In the position of the commutator herein shown, when the terminals a, b are short circuited by the contact member 51, no inductance is taken out from the closed oscillatory circuit 25 because the brush 77 is not in contact with a contact plate, but when the contact member 51 short circuits the terminals b, c, the inductance is taken out of the closed oscillatory circuit 25 because the brush 79 is now in contact with a contact strip. When the terminals A, B are short circuited by the contact member 50, no inductance is taken out of the open circuit because the brush 87 is not in contact with a contact plate, and hence the open and closed circuit remain in syntony. When, however, the contact member 50 short circuits the terminals B, C, then inductance is taken out of the open circuit, because the brushes 85, 86 engage contact strips 64, 65, and hence the electrical value of the said open circuit is changed to correspond to the change made in the electrical value of the circuit 25, and the said circuits are still in syntony, but responsive only to their wave characteristics.

It will thus be observed that when the terminals A, B and a, b are short circuited, no change in the inductance is made, but that when terminals B, C and b, c are short circuited, a change in the inductance is made. It will be evident that, although in the position of the commutator shown, no inductance is taken out upon short circuiting of the terminals A, B, a, b, yet the contact members 50, 51 are by the first wave or set of waves brought into position to short circuit the terminals B, C, b, c momentarily and the immediately following second wave or set of waves finds the circuit responsive thereto and causes continued or further energization of solenoid 39 and the holding of the core 40 in its uppermost position until the final device, mechanism or instrumentality is operated.

Inasmuch as it might be possible for the enemy to learn this changed electrical value, I provide means whereby this order may be varied so that inductance is taken out of circuit 25 upon short circuiting the terminals a, b and corresponding inductance is taken out of the open circuit upon short circuiting the terminals A, B and no inductance is taken out upon short circuiting the terminals b, c and B, C respectively. This I do by providing the contact strips 66, 67 and 68, 69 which are positioned as indicated, so that the contacts are reversed, as will be obvious without further description, thus requiring a reversal in the order of transmitting the two contrasting impulses or set of impulses.

Within the scope of my invention, the commutator may be provided with any number of series of contact strips, so that in a single rotation of the commutator the order of the changes may be reversed or varied as many times as desired.

It is not necessary that the commutator 52 be turned a step upon the receipt of each impulse or series of impulses by the receiving circuit 25, but only in the event that the enemy at its sending station be in control of the receiving station. In such event and preferably when the plunger 40 is lifted substantially to its maximum height the rack 55 turns the pinion 54 to cause the shaft 53 to be turned in a clockwise direction. For this purpose I have provided the plunger 40 with a lateral projection 88 adapted to engage the lateral projection 89 upon said plunger 56, and thereby to rotate the pinion 54, the piston 57 being elevated comparatively slowly, because of the slow escape of air through the exhaust port 59. I may therefore provide suitable means establishing a yielding connection between the lateral projections 88, 89, so that the plunger 40 may be permitted to move upwardly to bring the contact 42 into engagement with contact 45 without operating the rack 55 immediately upon engagement therewith. For this purpose I may provide a coil spring 90 carried by the lateral extension 88 and which will yield upon first engagement with the lateral projection 89 of the piston rod 56. If, however, the solenoid 39 remain energized for a lengthy period of time which may be predetermined, then the pinion 54 is rotated and the commutator 52 is turned one step.

Figure 3:
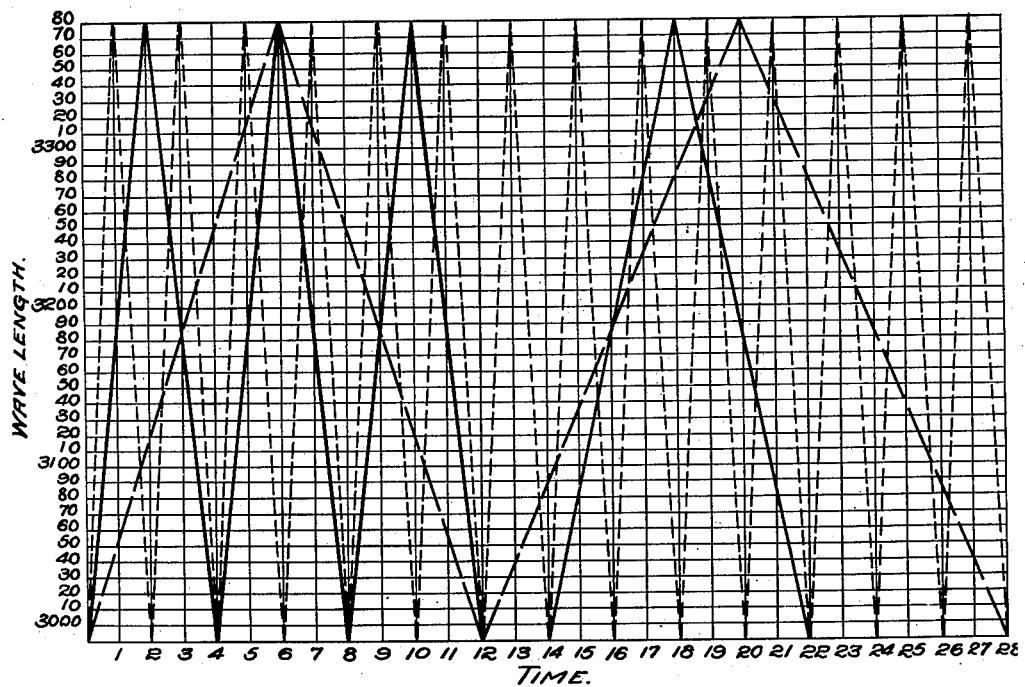
Fig. 3 is a diagram illustrating the action and effect of the automatic cut-out switch.

In Fig. 3, I have diagrammatically indicated the effect of employing a switch moved at a predetermined rate so as periodically to cut out the entire receiving circuit. In said figure I have indicated different wave lengths from 3000 to 3380 feet in length, it being obvious that these figures are chosen merely as representative. The horizontally arranged numerals at the base of the diagram indicate seconds or periods of time. The heavy black lines indicate the siren range. The broken lines with long dashes in inverted V form indicate the movement of the switch 21, and it will be observed, as therein shown, that the disk 20 is set to make one complete rotation in twelve seconds. During that period of time the said switch is twice positioned so as to complete the receiving circuit or render it operative, and during the greater portion of said period of twelve seconds all wave lengths are cut out as indicated and the sytem therefore rendered non-receptive thereto. The broken lines indicated by even length short dashes indicate the rotation of the disk 20 once in two seconds and the cutting out thereby of certain wave lengths emitted by a siren as described is indicated. It will be thus observed that the longer the period of time occupied in a single rotation of disk 20, the greater the number of wave lengths emitted by the siren which will be cut out, it being understood that in the disclosed diagram I have indicated the action of a siren, the wave length emitted by which is constantly varying as disclosed in my said application.

Having thus described one illustrative embodiment of my invention, I desire it to be understood that although specific terms are employed, they are used in a generic and descriptive sense and not for purposes of limitation, the scope of the invention being set forth in the following claims.

Claims:

1. A system for transmitting and receiving electromagnetic waves comprising means to transmit a plurality of differently characterized impulses or sets of impulses, a receiving oscillatory circuit responsive to one only of said wave characteristics, means actuated by the response of the circuit thereby to render said circuit responsive to the other impulse or sets of impulses and means controlled by said receiving circuit and actuated only by the combined action of a plurality of differently characterized impulses or sets of radiant energy.

2. A system for transmitting and receiving electromagnetic waves comprising, means to transmit a plurality of differently characterized impulses or sets of impulses, a single receiving oscillatory circuit therefor, means for rendering said circuit responsive in turn to said differently characterized impulses, a device controlled by said circuit, and means for effecting the action of said device only upon the response of said circuit to said differently characterized impulses.

3. A system for transmitting and receiving electromagnetic waves comprising, means to transmit a plurality of differently characterized impulses or sets of impulses, a single receiving circuit therefor having a single detecting means, means for varying the electrical constants of said circuit thereby to render it responsive in turn to said differently characterized impulses, a device controlled by said circuit, and means for effecting the action of said device only upon the response of said circuit to said differently characterized impulses.

4. A system for receiving radiant energy comprising a receiving circuit normally having a predetermined electrical value, means actuated in response to radiant energy received by said circuit to change the electrical value of said circuit, and means associated with said circuit and actuated in response thereto, only by the successive reception by said circuit of a plurality of differently characterized or contrasting impulses or sets of impulses of radiant energy.

5. A receiving system for radiant energy, comprising an oscillatory circuit and means automatically operating to render said circuit momentarily inoperative from time to time throughout any period in which said system is in operation, the said circuit being thus rendered inoperative through the greater portion of said period, in order to render "interference" with said system difficult.

6. A receiving system for radiant energy comprising in combination an oscillatory circuit, means for successively tuning said circuit to different frequencies and independent means for intermittently rendering said circuit inoperative.

7. A receiving system for radiant energy comprising in combination, a circuit tuned successively to different frequencies and means for intermittently disabling said circuit.

8. A receiving system for radiant energy comprising in combination an oscillatory circuit having variable electrical values, means controlled by said circuit for automatically changing said values proportionately, and means automatically operative to disable said circuit at predetermined intervals.

In testimony whereof, I have signed my name to this specification, in the presence of two subscribing witnesses.

JOHN HAYS HAMMOND, Jr.

Witnesses:
JOHN R. MOULTON,
IRVING U. TOWNSEND.